United States Patent [19]

Sobajima et al.

[11] Patent Number: 5,432,209

[45] Date of Patent: Jul. 11, 1995

[54] PROPYLENE RESIN COMPOSITION

[75] Inventors: Yoshihiro Sobajima; Keiko Kaba; Yoshihiro Noguchi, all of Yokkaichi, Japan

[73] Assignee: Mitsubishi Petrochemical Company Limited, Tokyo, Japan

[21] Appl. No.: 46,722

[22] Filed: Apr. 16, 1993

[30] Foreign Application Priority Data

Apr. 16, 1992 [JP] Japan .................................. 4-096677

[51] Int. Cl.$^6$ .............................. C08K 9/00; C08J 3/00; C08L 91/06; C08L 53/00
[52] U.S. Cl. ...................................... 523/200; 523/210; 523/217; 524/275; 524/277; 524/283; 524/306; 524/308; 524/451; 524/505; 525/89; 525/95
[58] Field of Search .................. 523/200, 210, 217; 524/275, 277, 283, 306, 308, 451, 505; 525/89, 95

[56] References Cited

U.S. PATENT DOCUMENTS

| | | | |
|---|---|---|---|
| 3,480,696 | 11/1969 | Hassell et al. | 525/95 |
| 4,073,766 | 2/1978 | Fein et al. | 524/427 |
| 4,276,208 | 6/1981 | Ogawa et al. | 524/605 |
| 4,914,155 | 4/1990 | Shimomura et al. | 525/98 |
| 5,045,589 | 9/1991 | Ueno | 525/89 |
| 5,196,270 | 3/1993 | Kitagawa et al. | 525/78 |

FOREIGN PATENT DOCUMENTS

| | | |
|---|---|---|
| 0430490 | 6/1991 | European Pat. Off. . |
| 0463963 | 1/1992 | European Pat. Off. . |
| 0509662 | 10/1992 | European Pat. Off. . |

OTHER PUBLICATIONS

Database WPI, Week 9217, Derwent Publications Ltd., London, GB; AN 92-136825 & JP-1-4077567 (Mitsubishi Petroch. K.K.) 11 Mar. 1992 *abstract*.
Chemical Abstracts, vol. 115, No. 24, 16 Dec. 1991, Columbus, Ohio, U.S.; abstract No. 257978j, *abstract* & JP-A-03146541 (Toyoda Gosei Co., Ltd.) 21 Jun. 1991.

*Primary Examiner*—Paul R. Michl
*Assistant Examiner*—Patrick Niland
*Attorney, Agent, or Firm*—Wenderoth, Lind & Ponack

[57] ABSTRACT

A propylene resin composition containing a propylene-ethylene block copolymer containing (a) a crystalline polypropylene moiety (constituent A) and an ethylene-propylene random copolymer moiety (constituent B), (b) a styrene-ethylene-butylene-styrene block copolymer which contains 10% to 25% of bound styrene, and (c) at least one filler selected from talc and inorganic whiskers and wherein the surface of the filler is treated with one of the organic compounds (I), (II) and (III) having the formulas, $$(R^1COO)_nM, \quad [I]$$

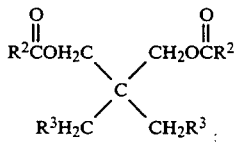

[II]

and

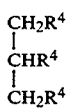

[III]

in which the various substituents and R groups are as defined in the specification and claims. The composition of the present invention has excellent mechanical strength, moldability and is capable of producing molded products having an excellent appearance.

8 Claims, No Drawings

PROPYLENE RESIN COMPOSITION

BACKGROUND OF THE INVENTION

1. Field of the Invention

This invention relates to polypropylene resin compositions for molding which have well-balanced mechanical strength properties and good moldability and which are capable of giving molded products having a good appearance.

2. Background Art

Heretofore, reinforced polypropylene resin compositions compounded with fillers such as talc and various whiskers or with a variety of rubbers have been widely used, by taking advantage of their excellent mechanical strength and moldability, as materials for a variety of molded products in the field of industrial parts, for example, parts of automobiles such as a bumper, an interior panel, a fan shroud and a glove compartment, and parts of household electric appliances such as a TV case, a VTR case and a cover for a washing machine.

Under such circumstances, improvements in the compositions have been made by dividing a filler into fine particles, by incorporating an ethylene—propylene copolymer rubber component, or by adding a dispersing agent such as a metallic salt or a wax when well-balanced mechanical strength properties, good moldability and a good appearance of molded products are particularly demanded.

However, each of the above manners for the improvements has problems: when a filler is divided into fine particles, the particles cause secondary flocculation, resulting in deterioration in the strength and the appearance of molded products; when a rubber component is incorporated, not only the production cost increases but also the rigidity of molded products decreases; and when a conventional dispersing agent is added, a metal mold is stained with the agent.

Specifically, the balance of mechanical strength properties between rigidity (heat resistance) and impact strength is poor, flow marks (wavy flow pattern) appear, for example, on an injection-molded product, and a mold used is stained. In addition, since the moldability (fluidity) is poor, the degree of freedom of the design of the above-described various molded products becomes low and improvement in the productivity of the molded products tends to be obstructed.

It is therefore a primary object of the present invention to solve the problems in the prior art and provide a polypropylene resin composition which has well-balanced mechanical strength properties and good moldability, and can give molded products of good appearance.

SUMMARY OF THE INVENTION

It has now been found by the present inventors that the above object can be attained by a propylene resin composition comprising a specific propylene—ethylene block copolymer, a specific styrene—ethylene—butylene—styrene block copolymer and a specific filler in a specific proportion.

Thus, the propylene resin composition according to the present invention comprises the following components (a), (b) and (c):

component (a): a propylene—ethylene block copolymer containing a crystalline polypropylene moiety (constituent A) and an ethylene—propylene random copolymer moiety (constituent B), in which the constituent A accounts for 60% to 95% by weight of the entire block copolymer, and has an MFR (melt flow rate) of 5 to 300 g/10 min. and a density of 0.9070 g/cm³ or more, and the constituent B accounts for 5% to 40% by weight of the entire block copolymer, and has an ethylene content of 20% to 80% by weight, the MFR of the entire block copolymer being from 3 to 200 g/10 min., and the ratio (Mw/Mn) of the weight-average molecular weight to the number-average molecular weight of the block copolymer being from 5 to 15, the amount of the component (a) being 100 parts by weight;

component (b): a styrene—ethylene—butylene—styrene block copolymer which contains 10% to 25% of bound styrene, and has a number-average molecular weight (Mn) of 30,000 to 100,000 and an MFR (230° C., 2.16 kg) of 3 to 25 g/10 min., the amount of the component (b) being from 3 to 100 parts by weight; and component (c): at least one filler selected from the group consisting of talc having a substantial full length of 15 μm or less, an average particle diameter of 1 to 6 μm and an average aspect ratio of 5 or more, and inorganic whiskers having an average diameter of 2 μm or less and an average aspect ratio of 5 or more, the surface of the filler being treated with at least one of the compounds represented by the following formulas [I], [II] and [III], the amount of the compound(s) used being from 0.01 to 8 parts by weight per 100 parts by weight of the filler:

$$(R^1COO)_nM \qquad [I]$$

wherein $R^1$ represents a monovalent hydrocarbon radical having a molecular weight of 250 to 500, or a hydroxyl group-containing monovalent hydrocarbon radical having a molecular weight of 250 to 500, M represents a lithium, calcium, strontium or barium atom, and n represents the same number as the valence of M;

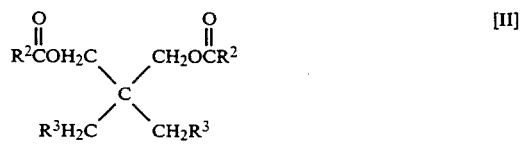

[II]

wherein $R^2$s which may be the same or different from each other, each represent a hydrocarbon radical having 4 to 29 carbon atoms, or a hydroxyl group-containing hydrocarbon radical having 4 to 29 carbon atoms, and $R^3$s, which may be the same or different from each other, each represent a group selected from the group consisting of a hydrocarbon radical having 1 to 8 carbon atoms, a hydrogen atom, a hydroxyl group and $R^2COO$—; and

[III]

wherein $R^4$s, which may be the same or different from one another, each represent a group selected from the group consisting of a hydrocarbon radical having 1 to 8 carbon atoms, a hydrogen atom, a hydroxyl group and R²COO—, provided that at least one of the R⁴s is R²COO—, and that the compound contains only one hydroxyl group even if it contains the group, the amount of the component (c) being from 3 to 100 parts by weight.

The propylene resin composition according to the present invention, unlike the conventional polypropylene resin compositions, does not stain a metal mold, has good moldability with high fluidity and well-balanced mechanical strength properties, and can give molded products having a good appearance. Accordingly, the composition of the present invention is advantageously used as a material for various molded products, for example, interior and exterior parts of automobiles such as a bumper, a fender, an interior panel, a fan shroud and a glove compartment, and household electric appliances such as a TV case, a VTR case, a cover for a washing machine and a case for a vacuum cleaner.

DETAILED DESCRIPTION OF THE INVENTION

[I] Propylene Resin Composition (1) Components
(a) Propylene—Ethylene Block Copolymer (Component (a))

The propylene—ethylene block copolymer, component (a), contained in the propylene resin composition of the present invention is a block copolymer containing a crystalline polypropylene moiety (constituent A) and an ethylene—propylene random copolymer moiety (constituent B). The amount of the constituent A is from 60% to 95% by weight, preferably from 70% to 95% by weight, of the entire block copolymer. It has an MFR of 5 to 300 g/10 min., preferably 10 to 250 g/10 min., and a density of 0.9070 g/cm³ or more, preferably 0.9075 g/cm³ or more, and more preferably 0.9080 g/cm³ or more. The amount of the constituent B is from 5% to 40% by weight, preferably from 5% to 30% by weight, of the entire block copolymer. The ethylene content of the constituent B is from 20% to 80% by weight, preferably from 25% to 75% by weight. The MFR of the entire propylene—ethylene block copolymer is from 3 to 200 g/10 min., preferably from 5 to 150 g/10 min., and more preferably from 10 to 100 g/10 min. The ratio (Mw/Mn) of the weight-average molecular weight to the number-average molecular weight of the block copolymer is from 5 to 15, preferably from 6 to 15.

The ethylene content of constituent B can be determined by means of infrared spectrum analysis or the like, and the MFRs can be measured in accordance with JIS-K7210 (230° C., 2.16 kg).

The amount of constituent B can be determined in the following manner: 2 g of a sample is dipped in 300 g of boiling xylene for 20 minutes and dissolved. The solution was cooled to room temperature. The solid phase precipitated is collected on a glass filter and then dried. The weight of this solid phase is measured, and the subtraction of that weight from the sample weight gives the amount of constituent B.

The ratio (Mw/Mn) of the weight-average molecular weight to the number-average molecular weight of the propylene—ethylene block copolymer can be determined by gel permeation chromatography (GPC).

Such a propylene—ethylene block copolymer as mentioned above can be prepared by slurry polymerization, vapor phase polymerization or liquid phase bulk polymerization, using a stereospecific polymerization catalyst. The polymerization may either be batch-wise or continuous. Further, when preparing the propylene—ethylene block copolymer, whichever moiety of the copolymer can be polymerized first. However, from the viewpoint of the quality, it is preferable to polymerize the crystalline polypropylene moiety first and then the ethylene—propylene random copolymer moiety.

As a stereospecific polymerization catalyst, a catalytic system in which an organic acid ester is added to the combination of a titanium trichloride composition and an organoaluminum compound has been conventionally known. However, when such a catalytic system is used for preparing the above block copolymers, especially those having a high MFR, a large amount of solvent-soluble secondary products are produced. As a result of studies by the present inventors, it was found that this problem can be solved by using a catalyst as disclosed in Japanese Laid-Open Patent Publications Nos. 187707/1987 and 246906/1987, which is a combination of a solid catalyst component obtained by bringing titanium tetrachloride, an organic acid halide and an organosilicon compound into contact with magnesium chloride, and an organoaluminum compound.

It is essential that the MFR of the propylene—ethylene block copolymer be in the range of 3–200 g/10 min. When the MFR of the block copolymer is less than the lower limit, the resulting composition shows poor moldability and cannot give molded products having a good appearance. On the other hand, when the MFR of the block copolymer is more than the upper limit, the molded products have poor impact resistance. It is preferable that the MFR of the block copolymer be adjusted to the above range simply by changing the polymerization conditions. However, it is also possible to first prepare a block copolymer having a low MFR, and then make the MFR higher by subjecting the block copolymer to a degradation treatment using a peroxide such as dialkyl peroxide, or to blend a low-MFR block copolymer and a high-MFR block copolymer so as to obtain the desired MFR value.

When the proportion of constituent B in the block copolymer is less than 5% by weight, the resin composition gives molded products having poor impact resistance. When the proportion of constituent B is higher than 40% by weight, or when the density of constituent A is lower than 0 9070 g/cm³, the rigidity (heat resistance) of molded products will be poor. Further, when the ratio (Mw/Mn) of the weight-average molecular weight to the number-average molecular weight of the block copolymer falls outside the above range, the resulting composition cannot provide molded products with a good appearance.

The block copolymer may comprise other unsaturated monomer(s), for example, α-olefins such as butene-1, vinyl esters such as vinyl acetate, and unsaturated organic acids or their derivatives such as acrylic acid and maleic anhydride, unless the use of such a monomer appreciably impair the advantages of the present invention.

(b) Styrene—Ethylene—Butylene—Styrene Block Copolymer (Component (b))

The styrene—ethylene—butylene—styrene block copolymer, component (b), contained in the propylene resin composition of the present invention is a styrene elastomer which contains 10% to 25%, preferably 13% to 25%, and more preferably 15% to 22% of bound styrene, and has a number-average molecular weight of 30,000 to 100,000, preferably 40,000 to 100,000, and more preferably 40,000 to 80,000, and an MFR (230° C., 2.16 kg) of 3 to 25 g/10 min., preferably 5 to 25 g/10 min., and more preferably 8 to 25 g/10 min.

When the amount of bound styrene, the number-average molecular weight and the MFR are not in the above respective ranges, the resulting resin composition will be poor in the properties, in particular, in the impact resistance.

In addition, it is desired that the vinyl content (the amount of 1,2-bond in the hydrogenated polybutadiene moiety) of the above elastomer be from 25% to 60%, particularly from 30% to 50%. Further, it is preferred that the ratio (Mw/Mn) of the weight-average molecular weight to the number-average molecular weight of the elastimer be in the range of 1 to 3, particularly in the range of 1.3 to 2.5.

The amount of bound styrene, the number-average molecular weight, the ratio of the weight-average molecular weight to the number-average molecular weight and the vinyl content can be determined by conventional means such as infrared spectrum analysis, gel permeation chromatography (GPC) and NMR.

A variety of styrene elastomers such as a styrene—butadiene—styrene block copolymer, a styrene—isoprene—styrene block copolymer and a styrene—ethylene—propylene block copolymer can be mentioned as copolymers similar to the styrene—ethylene—butylene—styrene block copolymer of the present invention. However, the advantages of the present invention cannot be obtained by the use of these styrene elastomers.

No particular limitation is imposed on the method for preparing the styrene—ethylene—butylene—styrene block copolymer of the present invention. In general, the block copolymer can be obtained by subjecting a styrene—butadiene—styrene copolymer to partial hydrogenation.

(c) Filler (Component (c))

The filler, component (c), contained in the propylene resin composition of the present invention is at least one filler selected from the group consisting of talc having a substantial full length of 15 μm or less, an average particle diameter of 1 to 6 μm and an average aspect ratio of 5 or more, and inorganic whiskers having an average diameter of 2 μm or less and an average aspect ratio of 5 or more, the surface of the filler being treated with a surface-treating agent comprising at least one of the compounds represented by the following general formulas [I], [II] and [III]:

$$(R^1COO)_nM \quad [I]$$

wherein $R^1$ represents a monovalent hydrocarbon radical having a molecular weight of 250 to 500, or a hydroxyl group-containing monovalent hydrocarbon radical having a molecular weight of 250 to 500, M represents a lithium, calcium, strontium or barium atom, and n represents the same number as the valence of M;

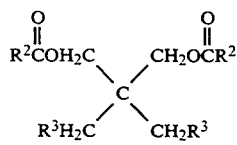

[II]

wherein $R^2$s, which may be the same or different from each other, each represent a hydrocarbon radical having 4 to 29 carbon atoms, or a hydroxyl group-containing hydrocarbon radical having 4 to 29 carbon atoms, and $R^3$s, which may be the same or different from each other, each represent a group selected from the group consisting of a hydrocarbon radical having 1 to 8 carbon atoms, a hydrogen atom, a hydroxyl group and $R^2COO$—; and

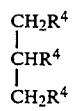

[III]

wherein $R^4$s which may be the same or different from one another, each represent a group selected from the group consisting of a hydrocarbon radical having 1 to 8 carbon atoms, a hydrogen atom, a hydroxyl group and $R^2COO$—, provided that at least one of the $R^4$s is $R^2COO$—, and that the compound contains only one hydroxyl group even if it contains the group.

Talc

The talc to be used in the present invention is one having a substantial full length of 15 μm or less, an average particle diameter of 1 to 6 μm, and an average aspect ratio of 5 or more.

Such a talc can be obtained, for example, by grinding a talc ore with an impact grinder or a micron mill-type grinder, further pulverizing it with a micron mill or a jet-type pulverizer, followed by classification with a cyclone or a micron separator. It is here preferred to use a talc ore produced in China because it contains only a little metal impurities.

The term "substantial" herein means that almost all talc particles have a length in the above range.

The average particle diameter of talc can be determined with a laser light scattering type particle size distribution meter, for example, "LA-500" manufactured by Horiba Seisakusho. The aspect ratio of talc can be determined with the use of a microscope.

When the length or the average aspect ratio of talc does not fall within the above mentioned respective ranges, or when the average particle diameter exceeds the above mentioned upper limit, the final resin composition is poor in the balance of mechanical strength properties and in the appearance of molded products. When the average particle diameter of talc is smaller than the above lower limit, it becomes difficult to thoroughly disperse the talc in preparing the resin composition, whereby the resulting composition is again poor in the balance of mechanical strength properties and the appearance of molded products.

Inorganic Whisker

The inorganic whiskers usable in the present invention have an average diameter of 2 μm or less and an average aspect ratio of 5 or more. Specific examples may include aluminum borate whiskers, potassium titanate whiskers, magnesium sulfate whiskers, carbon fibers, calcium carbonate whiskers and titanium oxide whiskers.

These whiskers preferably have an average diameter of 1 μm or less and an average aspect ratio of 10 or more. There is no particular limitation on the average length of such whiskers.

Surface Treatment of Filler

A filler selected from the above talc and inorganic whiskers is subjected to surface treatment in the manner described below. The use of the surface-treated filler is effective for improving the balance of mechanical strength properties of the resulting composition and the appearance of molded products.

<Treatment Conditions>

The surface of the filler is treated with a surface-treating agent as described below. The amount of agent used is from 0.01 to 8 parts by weight, preferably from 0.1 to 8 parts by weight, and more preferably from 0.3 to 8 parts by weight per 100 parts by weight of the filler.

The surface treatment can be carried out by mixing the filler and the surface-treating agent in a high-speed mixer or a tumbler.

The mixing for surface treatment is carried out generally at a temperature of 10° to 80° C., preferably 20° to 50° C., and at a revolution rate of 100 to 1000 rpm, preferably 200 to 600 rpm.

It is possible to conduct the kneading of the components (a), (b) and (c) and the surface treatment of the component (c) at the same time by adding a non-treated filler together with a surface-treating agent to the components (a) and (b) while kneading the components with a single-screw extruder or a twin-screw extruder to produce a propylene resin composition. It is however preferable to subject the filler to the surface treatment in advance.

<Surface-Treating Agent>

At least one compound selected from the compounds represented by the following general formulas [I], [II] and [III] is used as the surface-treating agent for the surface treatment of the above filler:

$(R^1COO)_nM$      [I]

wherein $R^1$ represents a monovalent hydrocarbon radical having a molecular weight of 250 to 500, or a hydroxyl group-containing monovalent hydrocarbon radical having a molecular weight of 250 to 500, M represents a lithium, calcium, strontium or barium atom, and n represents the same number as the valence of M;

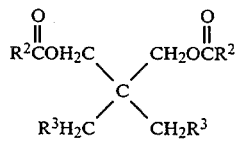

[II]

wherein $R^2$s, which may be the same or different from each other, each represent a hydrocarbon radical having 4 to 29 carbon atoms, or a hydroxyl group-containing hydrocarbon radical having 4 to 29 carbon atoms, and $R^3$s, which may be the same or different from each other, each represent a group selected from the group consisting of hydrocarbon radical having 1 to 8 carbon atoms, hydrogen atom, a hydroxyl group and $R^2COO$—; and

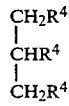

[III]

wherein $R^4$s, which may be the same or different from one another, each represent a group selected from the group consisting of a hydrocarbon radical having 1 to 8 carbon atoms, a hydrogen atom, a hydroxyl group and $R^2COO$—, provided that at least one of the $R^4$s is $R^2COO$—, and that the compound contains only one hydroxyl group even if it contains the group.

The compounds represented by the formula [I] are metallic salts of organic acids such as arachic acid, behenic acid, cerotic acid, montanic acid, melissic acid, abietic acid, dextropimaric acid or hydroxystearic acid.

Specifically, lithium behenate, lithium montanate, lithium hydroxystearate, calcium behenate, calcium montanate, calcium hydroxystearate, strontium behenate, barium behenate, barium hydroxystearate, barium montanate and the like can be mentioned.

Of these salts, calcium salts and barium salts are preferred, and calcium salts are particularly preferred.

Examples of the compounds represented by the formulas [I] and [II] include trimethylolpropane triester, trimethylolpropane diester, pentaerythritol tetraester, pentaerythritol triester, pentaerythritol diester, glycerin triester, glycerin diester, propylene glycol diester and propylene glycol monoester.

Specific examples of such compounds include trimethylolpropane tricaprate, trimethylolpropane trilaurate, trimethylolpropane trimyristate, trimethylolpropane tripalmitate, trimethylolpropane tristearate, trimethylolpropane tribehenate, trimethylolpropane trimontanate, trimethylolpropane trioleate, trimethylolpropane dicaprate, trimethylolpropane dilaurate, trimethylolpropane dimyristate, trimethylolpropane dipalmitate, trimethylolpropane distearate, trimethylolpropane dibehenate, trimethylolpropane dimontanate, pentaerythritol tetraheptate pentaerythritol tetracaprate, pentaerylthritol tetralaurate, pentaerythritol tetramyristate, pentaerythrit tetrapalmitate, pentaerythritol tetrastearate, pentaerythritol tetrabehenate, pentaerythritol tetramontanate, pentaerythritol tetraoleate, pentaerythritol tricaprate, pentaerythritol trilaurate, pentaerythritol trimyristate, pentaerythritol tripalmitate, pentaerythritol tristearate, pentaerythritol tribehenate, pentaerythritol trimontanate, pentaerythritol dicaprate, pentaerythritol dilaurate, pentaerythritol dimyristate, pentaerythritol dipalmitate, pentaerythritol distearate, pentaerythritol dibehenate, pentaerythritol dimontanate, glycerin trilaurate, glycerin trimyristate, glycerin tripalmitate, glycerin tristearate, glycerin tribehenate, glycerin trimontanate, glycerin dilaurate, glycerin dimyristate, glycerin dipalmitate, glycerin distearate, glycerin dibehenate, glycerin dimontanate, propylene glycol dilaurate, propylene glycol dimyristate, propylene glycol dipalmitate, propylene glycol distearate, propylene glycol dibehenate, propylene glycol dimontanate, propylene glycol monolaurate, propylene glycol monomyristate, propylene glycol monopalmitate, propylene glycol monostearate, propylene glycol monobehenate and propylene glycol monomontanate.

Of the above compounds, trimethylolpropane tristearate, trimethylolpropane tribehenate, pentaerythritol tetraheptate, pentaerythritol tetracaprate, pentaerythritol tetralaurate, pentaerythritol tetramyristate, pentaerythritol tetrapalmitate, pentaerythritol tetrastearate, pentaerythritol tetrabehenate, pentaerythritol tetramontanate, pentaerythritol tetraoleate, pentaerythritol tristearate, pentaerythritol tribehenate, pentaerythritol trimontanate, pentaerythritol distearate, pentaerythritol dibehenate, glycerin trilaurate, glycerin trimyristate, glycerin tripalmitate, glycerin tristearate, glycerin tribehenate, glycerin trimontanate, glycerin distearate, glycerin dibehenate, propylene glycol monostearate and propylene glycol monobehenate are preferred; and pentaerythritol tetraheptate, pentaerythritol tetracaprate, pentaerythritol tetralaurate, pentaerythritol tetramyristate, pentaerythritol tetrapalmitate, pentaerythritol tetrastearate, pentaerythritol tetrabehenate, pentaerythritol tetramontanate, pentaerythritol tetraoleate, glycerin trilaurate, glycerin trimyristate, glycerin tripalmitate, glycerin tristearate, glycerin tribehenate and glycerin trimontanate are particularly preferred.

(d) Additional Components (Compound (d))

In addition to the above essential components (a), (b) and (c), the propylene resin composition of the invention may be blended with various additives known in the art such as a pigment, an antioxidant, an antistatic agent, a flame retardant and a dispersing agent. Moreover, a variety of resins, elastomers and fillers other than the essential components (a), (b) and (c), can also be incorporated into the composition unless they impair the advantages of the present invention.

Described below are preferable specific examples of the elastomers which can be added to the essential components: ethylene elastomers such as an ethylene—propylene bipolymer (EPM), an ethylene—propylene—non-conjugated diene terpolymer (EPDM), an ethylene—butene-1 bipolymer rubber and an ethylene—propylene—butene-1 terpolymer rubber; styrene elastomers other than the component (b) such as a styrene—ethylene—propylene block copolymer; and those elastomers which are obtained by at least partly modifying the above-enumerated elastomers with an unsaturated organic acid or its derivatives such as acrylic acid or maleic anhydride. Further, a filler which corresponds to untreated component (c) is also one of the preferable additional components.

(2) Proportion of Components

In the propylene resin composition of the present invention, the proportion of each component is important.

The amount of the styrene—ethylene—butylene—styrene block copolymer, component (b), is from 3 to 100 parts by weight, preferably from 8 to 80 parts by weight, and more preferably from 10 to 40 parts by weight per 100 parts by weight of the propylene—ethylene block copolymer, component (a).

In the case where the amount of component (b) is less than 3 parts by weight, the resin composition has poor impact resistance. On the other hand, when the amount of component (b) is in excess of 100 parts by weight, the resin composition has poor rigidity (heat resistance), and cannot give molded products having a good appearance.

The amount of the filler, component (c), is from 3 to 100 parts by weight, preferably from 8 to 80 parts by weight, and more preferably from 15 to 60 parts by weight per 100 parts by weight of the propylene—ethylene block copolymer, component (a).

In the case where the amount of component (c) is less than 3 parts by weight, the resin composition gives molded products which are poor in rigidity (heat resistance) and dimensional stability. On the other hand, when the amount of component (c) is in excess of 100 parts by weight, the resin composition gives molded products which are poor in impact resistance and appearance.

[II] Preparation of Propylene Resin Composition

The propylene resin composition of the present invention can be prepared by mixing the above-described components (a), (b) and (c), and optionally the component (d), in the aforementioned proportion.

The mixing is usually carried out by kneading the components with a conventional kneading machine such as a single-screw extruder, a twin-screw extruder, a Banbury mixer, a roller, a Bravender Plastograph or a kneader. It is preferable to employ the kneading-granulation method in order to thoroughly disperse each component, and a twin-screw extruder is usually used for this purpose. To prepare the resin composition, all of the components can be kneaded at the same time; or, with a view to improving the properties of the resin composition, such a manner can also be taken that a portion or all of the components (a) and (b) are kneaded first, the remaining components are then added thereto, and the resulting mixture is subjected to kneading and granulation.

The kneading is conducted usually at a temperature of 190° to 250° C., preferably 200° to 240° C.

As described above, it is also possible to conduct the kneading of the respective components and the surface treatment of component (c) at the same time by adding the surface-treating agent to the components while kneading.

[III] Molding and Use of Propylene Resin Composition

The propylene resin composition thus obtained can be molded by various molding methods such as injection molding, compression molding and extrusion (sheet-extrusion, blow-extrusion, etc.) to prepare a variety of molded products. Of these molding methods, injection molding and injection-compression molding (press injection) are preferably employed to make the best use of the advantageous properties of the composition of the present invention.

The propylene resin composition of the present invention has good moldability (fluidity) and gives molded products having well-balanced mechanical strength properties and a good appearance. The composition hardly stains a metal mold. Furthermore, the composition exhibits excellent paintability and dimensional stability. The composition of the present invention can therefore be advantageously used for various molded products in the field of industrial parts, especially for functional products or large-sized products, for instance, exterior and interior parts of automobiles such as a bumper, a fender, a spoiler, an interior panel, a trim and a glove compartment; parts of household electric appliances such as a TV case, a VTR case, a cover for a washing machine and a case for a vacuum cleaner; and parts of acoustic appliances such as a case for a stereo record player.

The present invention will now be explained in more detail with reference to the following examples, which are given merely for illustrating the invention and are not intended to be limiting thereof. Evaluation methods taken herein are as follows:

<Moldability>

Fluidity

The molding (flow) length (average value) of a spiral specimen (double-spiral) with a width of 14 mm and a thickness of 2.5 mm was measured. The molding of the specimen was conducted using an injection molding machine "IS-170" manufactured by Toshiba Machine Co., Ltd. under the conditions of 230° C. and 600 kg/cm².

Appearance (Flow Mark)

The appearance (flow mark) of the above spiral specimen was visually observed.

<Judgment>

Grade 1: Observed almost no flow mark.
Grade 2: Observed flow mark slightly, but practically usable.
Grade 3: Observed flow mark clearly, unsuitable for practical use.
Grade 4: Observed flow mark remarkably.

Staining of Metal Mold

A sheet with a length of 100 mm, a width of 100 mm and a thickness of 3 mm was continuously molded, under the conditions of 220° C. and 600 kg/cm², using the above injection molding machine with approximately 50% of the mold cavity filled with a resin. The number of shots before the mold was stained and a white opaque pattern began to be observed at the edge of the resin filled was counted. A larger number of shots indicates more suppressed staining of the mold.

<Evaluation of Mechanical Strength Properties>

Flexural Modulus

Measured in accordance with JIS-K7203 at a temperature of 23° C. Measured values can also be an indication of heat resistance.

Izod Impact Strength

Measured in accordance with JIS-K7110 (notched) at a temperature of 23° C.

EXAMPLES 1 TO 4 & COMPARATIVE EXAMPLES 1 TO 4

The following component (a) (powder), component (b) and component (c) (except c-1) in the proportion shown in Table 1, together with 0.08 part by weight of tetrakis[methylene-3-(3′,5′-di-t-butyl-4′-hydroxyphenyl)propionate]methane and 0.07 part by weight of distearyl thiodipropionate, each based on 100 parts by weight of the total amount of components (a)–(c), were thoroughly mixed in a high-speed mixer.

Thereafter, the mixture was kneaded and granulated using a high-speed twin-screw extruder manufactured by Kobe Steel, Ltd. at a temperature of 220° C. (note that only c-1 was separately fed from the rear part of the extruder). The pellets thus obtained were placed in the above-described injection molding machine, and molded into specimens to be used for the above measurements of mechanical strength properties, and also into the above-described spiral specimens. With these specimens, the above measurements were conducted. The results are shown in Table 1.

Component (a)

a-1: A propylene—ethylene block copolymer having an MFR of 35 g/10 min. and an Mw/Mn ratio of 8, containing 87% by weight of a crystalline polypropylene moiety (constituent A) having an MFR of 90 g/10 min. and a density of 0.9091 g/cm³, and 13% by weight of an ethylene—propylene random copolymer moiety (constituent B) with an ethylene content of 38% by weight.

a-2: A propylene—ethylene block copolymer having an MFR of 30 g/10 min. and an Mw/Mn ratio of 8.5, containing 85% by weight of a crystalline polypropylene moiety (constituent A) having an MFR of 75 g/10 min. and a density of 0.9089 g/cm³, and 15% by weight of an ethylene—propylene random copolymer moiety (constituent B) with an ethylene content of 42% by weight.

a-3: A propylene—ethylene block copolymer having an MFR of 25 g/10 min. and an Mw/Mn ratio of 4.7, containing 93% by weight of a crystalline polypropylene moiety (constituent A) having an MFR of 45 g/10 min. and a density of 0.9062 g/cm³, and 7% by weight of an ethylene—propylene random copolymer moiety (constituent B) with an ethylene content of 70% by weight.

Component (b)

b-1: A styrene—ethylene—butylene—styrene block copolymer containing 20% of bound styrene, having a number-average molecular weight of 55,000, an MFR of 12 g/10 min. and a vinyl content of 35%.

b-2: A styrene—ethylene—butylene—styrene block copolymer containing 15% of bound styrene, having a number-average molecular weight of 58,000, an MFR of 21 g/10 min. and a vinyl content of 49%.

b-3: An ethylene—propylene copolymer rubber having an MFR of 1 g/10 min. and a propylene content of 26% by weight.

b-4: A styrene—ethylene—butylene—styrene block copolymer containing 40% of bound styrene, having a number-average molecular weight of 70,000, an MFR of 1 g/10 min. and a vinyl content of 35%.

Component (c)

c-1: A filler obtained by subjecting magnesium sulfate whiskers having an average diameter of 0.6 μm and an average aspect ratio of 28 to surface treatment (blending in a mixer) with 5 parts by weight of pentaerythritol tetrastearate per 100 parts by weight of the whiskers.

c-2: A filler obtained by subjecting talc having a substantial full length of 15 μm or less (99.5% of the particles of talc having a length of less than 10 μm), an average particle diameter of 2.9 μm and an average aspect ratio of 6 to surface treatment (blending in a high-speed mixer) with 2.5 parts by weight of pentaerythritol tetrastearate per 100 parts by weight of the talc.

c-3: A filler obtained by subjecting the same untreated talc as described above to surface treatment (blending in a high-speed mixer) with 2 parts by weight of glycerin tristearate per 100 parts by weight of the talc.

c-4: A filler obtained by subjecting the same untreated talc as described above to surface treatment (blending in a high-speed mixer) with 1 part by weight of calcium behenate per 100 parts by weight of the talc.

c-5: Untreated talc having an average particle diameter of 8.6 μm, in which 9% of the particles have a length of more than 15 μm and 70.5% of the particles have a length of less than 10 μm.

c-6: A filler obtained by subjecting the same untreated talc as in c-2 to surface treatment (blending in a high-speed mixer) with 2 parts by weight of magnesium stearate per 100 parts by weight of the talc.

c-7: A filler obtained by subjecting the same untreated talc as in c-2 to surface treatment (blending in a high-speed mixer) with 5 parts by weight of pentaerythritol monocaprate per 100 parts by weight of the talc.

It is apparent from Table 1 that all of the resin compositions of Examples 1 to 4 have well-balanced mechanical strength properties and good moldability, and give molded products having a good appearance. Further, with the resin compositions, the staining of mold is considerably suppressed.

On the other hand, the resin compositions of Comparative Examples 1 to 4 are poor in all of or some of the balance of mechanical strength properties, moldability, the appearance of molded products and the staining of mold.

formulas [I], [II] and [III], the amount of the compound(s) used being from 0.01 to 8 parts by weight per 100 parts by weight of the filler:

$$(R^1COO)_nM \qquad [I]$$

wherein $R^1$ represents a monovalent hydrocarbon radical having a molecular weight of 250 to 500, or a hydroxyl group-containing monovalent hydrocarbon radical having a molecular weight of 250 to 500, M represents a lithium, calcium, strontium or barium atom, and n represents the same number as the valence of M;

TABLE 1

| | Composition | | | | | | Moldability | | | Mechanical Strength | |
|---|---|---|---|---|---|---|---|---|---|---|---|
| | Component (a) Block Copolymer | | Component (b) Styrene Elastomer | | Component (c) Filler | | Fluidity [Length of Spiral] (mm) | Appearance [Flow Mark] (grade) | Staining of Mold (Shot number at which staining occurred) | Flexural Modulus (kg/cm²) | Izod Impact Strength at 23° C. (kg · cm/cm²) |
| | Type | Parts by weight | Type | Parts by weight | Type | Parts by weight | | | | | |
| Example 1 | a-1 | 100 | b-1 | 11 | c-1 | 20 | 920 | 1 | 34 | 26,500 | 40 |
| Example 2 | a-1 | 100 | b-2 | 12 | c-2 | 38 | 885 | 1 | 31 | 27,800 | 49 |
| Example 3 | a-1 | 100 | b-2 | 17 | c-3 | 50 | 815 | 2 | 27 | 31,300 | 52 |
| Example 4 | a-2 | 100 | b-2 | 19 | c-4 | 51 | 780 | 1 | 36 | 29,100 | 59 |
| Comp. Example 1 | a-3 | 100 | b-3 | 12 | c-5 | 38 | 610 | 4 | — | 22,600 | 8 |
| Comp. Example 2 | a-2 | 100 | b-3 | 12 | c-6 | 38 | 665 | 3 | 4 | 24,300 | 12 |
| Comp. Example 3 | a-2 | 100 | b-4 | 12 | c-6 | 38 | 645 | 3 | 3 | 23,900 | 11 |
| Comp. Example 4 | a-2 | 100 | b-4 | 12 | c-7 | 38 | 670 | 3 | 4 | 23,200 | 10 |

What is claimed is:

1. A propylene resin composition comprising the following components (a), (b) and (c):

component (a): a propylene—ethylene block copolymer containing a crystalline polypropylene moiety (constituent A) and an ethylene—propylene random copolymer moiety (constituent B), in which the constituent A accounts for 60% to 95% by weight of the entire block copolymer, and has an MFR (230° C., 2.16 kg) of 5 to 300 g/10 min. and a density of at least 0.9070 g/cm, and the constituent B accounts for 5% to 40% by weight of the entire block copolymer, and has an ethylene content of 20% to 80% by weight, the MFR (230° C., 2.16 kg) of the entire block copolymer being from 3 to 200 g/10 min., and the ratio (Mw/Mn) of the weight-average molecular weight to the number-average molecular weight of the block copolymer being from 5 to 15, the amount of the component (a) being 100 parts by weight;

component (b): a styrene—ethylene—butylene—styrene block copolymer which contains 10% to 25% of bound styrene, and has a number-average molecular weight (Mn) of 30,000 to 100,000 and an MFR (230° C., 2.16 kg) of to 25 g/10 min., the amount of the component (b) being from 3 to parts by weight; and component (c): at least one filler selected from the group consisting of talc having a substantial full length of no more than 15 μm, an average particle diameter of i to 6 μm and an average aspect ratio of at least 5, and inorganic whiskers having an average diameter of no more than 2 μm and an average aspect of at least 5, the surface of the filler being treated with at least one of the compounds represented by the following

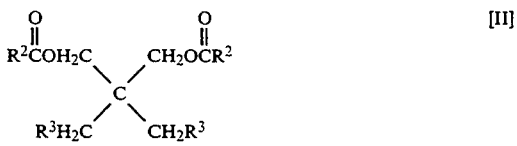

wherein $R^2$s, which may be the same or different from each other, each represent a hydrocarbon radical having 4 to 29 carbon atoms, or a hydroxyl group-containing hydrocarbon radical having 4 to 29 carbon atoms, and $R^3$s, which may be the same or different from each other, each represent a group selected from the group consisting of a hydrocarbon radical having 1 to 8 carbon atoms, a hydrogen atom, a hydroxyl group and $R^2COO$—; and

wherein $R^4$s, which may he the same or different from one another, each represent a group selected from the group consisting of a hydrocarbon radical having 1 to 8 carbon atoms, a hydrogen atom, a hydroxyl group and $R^2COO$—, provided that at least one of the $R^4$s is $R^2COO$—, and that the compound contains only one hydroxyl group even if it contains the group, the amount of the component (c) being from 3 to 100 parts by weight.

2. The propylene resin composition according to claim 1, wherein the constituent A in component (a) has a density of at least 0.9080 g/cm³.

3. The propylene resin composition according to claim 1, wherein the MFR of component (a) is from 10 to 100 g/10 min.

4. The propylene resin composition according to claim 1, wherein the component (b) has an MFR of 8 to 25 g/10 min.

5. The propylene resin composition according to claim 1, wherein the component (b) has an Mw/Mn ratio of 1.3 to 2.5.

6. The propylene resin composition according to claim 1, wherein the inorganic whiskers of component (c) are selected from aluminum borate whiskers, potassium titanate whiskers, magnesium sulfate whiskers, carbon fibers, calcium carbonate whiskers and titanium oxide whiskers.

7. The propylene resin composition according to claim 6, wherein the inorganic whiskers have an average diameter of no more than 1 μm and an average aspect ratio of at least 10.

8. The propylene resin composition according to claim 1, wherein the compound represented by the general formula (I) is a metallic salt of an organic acid selected from the group consisting of arachic acid, behenic acid, cerotic acid, montanic acid, melissic acid, abietic acid, dextropimaric acid and hydroxystearic acid.

* * * * *